Aug. 26, 1941.  R. H. VERMILLION  2,253,826

CLOSURE OPERATOR AND LATCH

Original Filed Sept. 23, 1938

INVENTOR.
Raymond H. Vermillion
BY R. W. Smith
ATTORNEY.

Patented Aug. 26, 1941

2,253,826

UNITED STATES PATENT OFFICE 2,253,826

CLOSURE OPERATOR AND LATCH

Raymond H. Vermillion, Los Angeles, Calif., assignor, by mesne assignments, to Brinck Engineering Company, Inc., Los Angeles, Calif., a corporation of California Original application September 23, 1938, Serial No. 231,387. Divided and this application October 16, 1939, Serial No. 299,702

2 Claims. (Cl. 268—74)

This invention is a closure latch, the present application being a division of my copending application Ser. No. 231,387, filed September 23, 1938.

It is an object of the invention to provide a closure latch, particularly applicable to processing apparatus such as employed for roasting coffee and the like and wherein pressure is generated during processing of the material; the closure latch providing for securely retaining a closure for the apparatus in its closed position against pressure generated therein, and adapted for actuation for first releasing the closure and then swinging the same to open position whereby the pressure generated in the apparatus assists such opening movement, and adapted for reverse actuation for swinging the closure to closed position and automatically latching the same.

Further objects of the invention will be readily understood from the following description of the accompanying drawing, in which.

Figure 1:
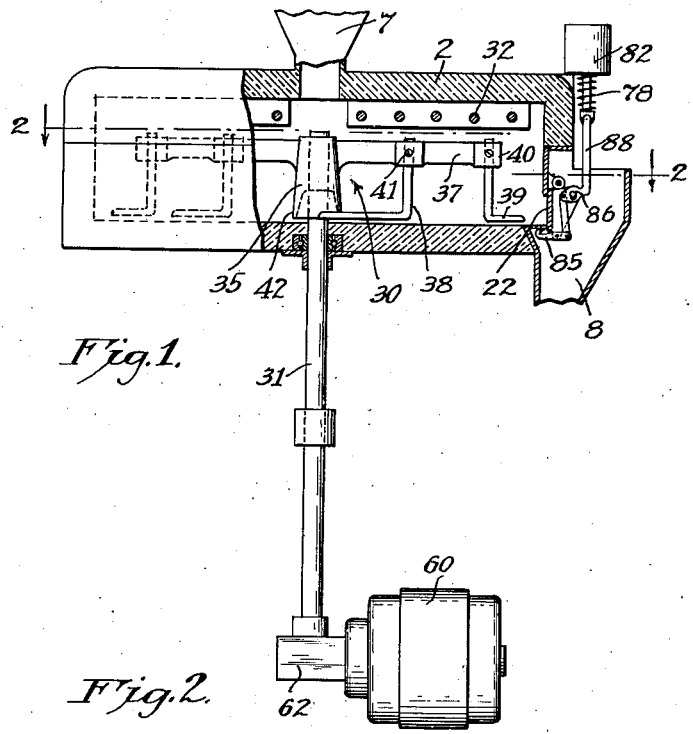
Fig. 1 is a side elevation, partly in axial section, of a coffee roasting apparatus embodying the invention.

The closure latch is particularly applicable, and is herein described in connection with the oven of a coffee roasting apparatus.

As an instance of such apparatus, the material to be processed, such as green coffee, is supplied via a funnel 7 to a roasting oven 2, and a discharge spout 8 leads from the roasting oven to a cooling chamber (not shown). Supply of green coffee to the roasting oven, via the funnel 7, may be controlled as disclosed in my aforementioned copending application Ser. No. 231,387, filed September 23, 1938; and a door 22 controls discharge of roasted coffee from the roasting oven to the spout 8.

In the roasting oven 2, the green coffee which is supplied via the funnel 7 is spread out on the base of the oven and is turned over and over, and while the door 22 remains closed it is moved around the oven and radially back and forth therein. During this movement of the coffee it is roasted, preferably by heat generated by electrical heating elements 32 which are mounted on the underside of the top of the oven. When the coffee has been roasted and the door 22 is opened, the roasted coffee is moved around the oven for centrifugal discharge via the open door.

For thus moving the coffee in the oven, an agitator 30 is employed. It is preferably of the type disclosed and claimed in my copending application, Ser. No. 299,701, filed October 16, 1939, which is a division of my aforementioned copending application Ser. No. 231,387, filed September 23, 1938.

The agitator preferably comprises a hub 35 fixed on a shaft 31 and having a diametrical arm 37 fixed to the upper end of the hub below the heating elements 32. Shanks 38 depend from the arm 37 and terminate in lateral fingers 39 which just clear the base of the oven 2, and the shanks 38 are rotatably adjustable in bearings 40 of the arm 37 and may be locked in adjusted position by set screws 41, so that the fingers may be positioned in any desired angular relation to radii of rotation of the agitator.

Figure 2:
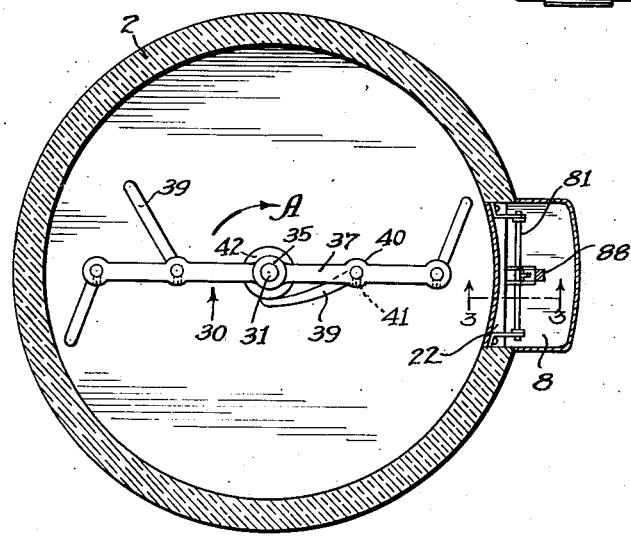
Fig. 2 is a section on the line 2—2 of Fig. 1.

The hub 35 preferably forms a tapering baffle 42 for directing the coffee away from the axis of rotation; and the fingers are adjusted so that while the door 22 is closed and during rotation of the arm 37 as indicated by arrow A (Fig. 2), the fingers move through the coffee, spreading it out and tumbling it on the base of the oven, and at the same time moving it around the oven and radially back and forth therein. When the door 22 is opened, the fingers move the coffee around the oven and eventually centrifugally discharge all of the roasted coffee through the open door and into the spout 8.

The shaft 31 may be driven by an electric motor 60 which preferably has a worm drive for the shaft 31, with the worm drive housed within a casing 62.

An automatic control, not shown in this application but described in detail in my aforementioned copending application Ser. No. 231,387, filed September 23, 1938, supplies a measured quantity of green coffee via the funnel 7 to the roasting oven 2, and opens the door 22 after a predetermined time interval, for discharge of the roasted coffee via the spout 8, and then recloses the door after a predetermined time interval sufficient for discharging all the roasted coffee. For this purpose the door 22 is preferably electrically controlled, with automatically timed actuation of the electrical control to provide the desired cycle of operation. As an instance the door 22 is actuated by a solenoid 82.

The door 22 is preferably a hinged door in the peripheral wall of the oven 2 and opening outwardly and upwardly, thereby permitting opening and closing without the pressure which may be generated in the oven 2 tending to bind the door.

A latch 85 is provided for this hinged closure, whereby when the solenoid 82 is energized the latch is first released and the door 22 is then swung open, with opening movement of the door assisted by the pressure which may have been generated in the oven. When the solenoid 82 is deenergized the door 22 swings to closed position, and the latch 85 automatically engages for securing the door in closed position against opening movement responsive to pressure generated in the oven.

As an instance of this arrangement, the door 22 is fixed to a bracket 80 which is pivoted at 81 to the oven 2, and the latch 85 is pivoted to the bracket 80 as shown at 87. The head of the latch releasably engages in back of an abutment 83 on the oven 2, and the opposite end of the latch is linked at 84 to a slide 88 which has a slotted pivotal mounting 86 on the bracket 80. The slide 88 is controlled by the solenoid 82, being elevated by the solenoid when the latter is energized, and being depressed by a spring 78 when the solenoid is deenergized.

Figure 3:
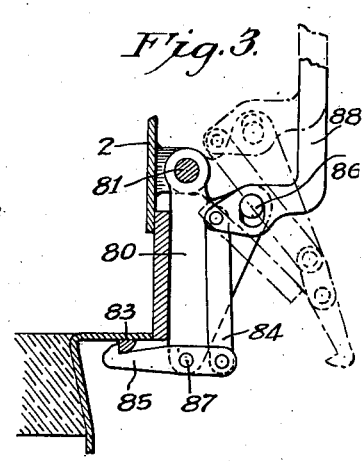
Fig. 3 is an enlarged side elevation of the closure latch.

With the solenoid 82 deenergized and the latch in operative position as shown by solid lines at Fig. 3, the head of the latch 85 is hooked in back of the abutment 83, thereby securing the door 22 against opening swinging movement. When the solenoid 82 is energized (thereby elevating the slide 88), initial elevation of the slide swings the latch 85 on its pivot 87 via the link connection 84, thereby disengaging the head of the latch from the abutment 83. Due to the lost-motion which is provided at the slotted pivotal mounting 86, this initial elevation of the slide and consequent release of the latch 85 is accomplished without swinging the door 22 on its pivot 81. But when the latch has been released and the lost-motion at 86 has been taken up, continued elevation of the slide 88 swings the door 22 to its open position as shown by broken lines at Fig. 3.

When the solenoid 82 is subsequently deenergized (whereby the spring 78 tends to depress the slide 88), the door 22 swings to closed position by gravity. As the door approaches closed position the head of the latch 85 rides over the abutment 83, as permitted by the latch pivoting at 87. This pivotal movement of the latch is made possible by the spring 78 yielding so that the slide 88 may shift upwardly relative to the bracket 80 at the slotted connection 86, thereby permitting upward shifting of the link connection 84. When the door 22 has been closed and the head of the latch has ridden over the abutment 83, the spring 78 shifts the slide 88 downwardly relative to the bracket 80 at the slotted connection 86, thereby pivoting the latch at 87, by downward shifting of the link connection 84, for hooking the head of the latch in its operative position in back of the abutment 83.

When the door 22 is closed, the latch 85 thus secures it in closed position. When the slide 88 is elevated, it first releases the latch and then swings the door to open position and retains it in open position as long as the solenoid 82 is energized. When the solenoid is deenergized the door 22 swings to closed position by gravity and the head of the latch automatically hooks in back of the abutment 83, thereby securing the door in closed position until the solenoid 82 is again energized.

I claim:

1. In combination, a closure pivoted on a horizontal axis, a latch pivoted on the closure on a horizontal axis, an abutment operatively engaged by the latch when the closure is closed, a slide, a slotted pivotal connection between the slide and the closure, the pivotal axis of the slotted connection being horizontal and the length of the slotted connection being vertical, a link pivotally connected to the latch and to the slide, a spring tending to depress the slide and adapted to yield for elevation of the slide, and an electrical solenoid which when energized initially elevates the slide relative to the closure at the slotted pivotal connection for swinging the latch on its pivot so as to disengage it from the abutment, with the energized solenoid then continuing elevation of the slide so as to swing the closure to open position by the slotted pivotal connection between the slide and the closure, the closure swinging to closed position by gravity when the solenoid is deenergized, with the spring yielding for elevation of the slide relative to the closure at the slotted pivotal connection so that the latch may ride over the abutment by swinging the latch on its pivot, and the spring then depressing the slide relative to the closure at the slotted pivotal connection for swinging the latch on its pivot so as to operatively engage the abutment.

2. In combination, a closure pivoted on a horizontal axis, a latch pivoted on the closure, an abutment operatively engaged by the latch when the closure is closed, a slide, a slotted pivotal connection between the slide and the closure, the pivotal axis of the slotted connection being horizontal, a link pivotally connected to the latch and to the slide, tensioning means tending to shift the slide in one direction lengthwise of the slotted pivotal connection and adapted to yield for shifting of the slide in the opposite direction, and operating means adapted to actuate or release the slide, the operating means when actuating the slide initially shifting the same in said opposite direction relative to the closure at the slotted pivotal connection for swinging the latch on its pivot so as to disengage it from the abutment, with the operating means then continuing shifting of the slide in said opposite direction so as to swing the closure to open position by the slotted pivotal connection between the slide and the closure, the closure swinging to closed position by gravity when the operating means releases the slide, with the tensioning means yielding for shifting of the slide in said opposite direction relative to the closure at the slotted pivotal connection so that the latch may ride over the abutment by swinging the latch on its pivot, and the tensioning means then shifting the slide in said first mentioned direction relative to the closure at the slotted pivotal connection for swinging the latch on its pivot so as to operatively engage the abutment.

RAYMOND H. VERMILLION.